US009025904B2

(12) United States Patent  (10) Patent No.: US 9,025,904 B2
Doublet et al.  (45) Date of Patent: May 5, 2015

(54) METHOD AND DEVICE FOR OBTAINING AN IMAGE OF A CRUMPLED DOCUMENT FROM AN IMAGE OF SAID DOCUMENT WHEN SAME IS CRUMPLED

(75) Inventors: Julien Doublet, Paris (FR); Michaël Verilhac, Paris (FR); Stephane Revelin, Paris (FR); Sylvaine Picard, Paris (FR)

(73) Assignee: Morpho, Paris (FR)

( * ) Notice: Subject to any disclaimer, the term of this patent is extended or adjusted under 35 U.S.C. 154(b) by 228 days.

(21) Appl. No.: 13/504,539

(22) PCT Filed: Oct. 26, 2010

(86) PCT No.: PCT/EP2010/066190
§ 371 (c)(1),
(2), (4) Date: Oct. 25, 2012

(87) PCT Pub. No.: WO2011/051297
PCT Pub. Date: May 5, 2011

(65) Prior Publication Data
US 2013/0129248 A1  May 23, 2013

(30) Foreign Application Priority Data
Oct. 30, 2009  (FR) ...................................... 09 57674

(51) Int. Cl.
*G06K 9/40* (2006.01)
*G06T 5/00* (2006.01)
(Continued)

(52) U.S. Cl.
CPC ............... *G06T 5/002* (2013.01); *G06T 3/0031* (2013.01); *G06T 15/10* (2013.01)

(58) Field of Classification Search
USPC ............. 33/453; 342/126, 450; 356/3.01, 3.1, 356/602, 623, 631; 382/264, 464; 493/407
See application file for complete search history.

(56) References Cited

U.S. PATENT DOCUMENTS

2005/0175255 A1  8/2005  Fujimoto

FOREIGN PATENT DOCUMENTS

EP  1067362  1/2001

OTHER PUBLICATIONS

Brown, M.S., et al: "Image Restoration of Arbitrarily Warped Documents," Oct. 1, 2004.*

(Continued)

*Primary Examiner* — Gregory F Cunningham
(74) *Attorney, Agent, or Firm* — Oliff PLC; R. Brian Drozd

(57) ABSTRACT

The present invention relates to a method and device for obtaining an image of a crumpled document from an image of this document when it is crumpled. The method comprises a step of determining a three-dimensional geometric model of the surface of the crumpled document by triangulation of three-dimensional points defined from the pattern of a target extracted from the image of this document when it is crumpled; the method is characterized in that it comprises a step of determining a projection of the three-dimensional geometric model onto a so-called acquisition plane, by means of error minimization of this projection under constraints of preserving defined geometric characteristics in the vicinity of the three-dimensional points, and in that it comprises a step of superimposing the textures associated with the three-dimensional model onto the projection of this model thus determined. The present invention likewise relates to target patterns that make it possible to improve the quality of the image resulting from the method to be improved and/or to reduce the cost for computing said image.

10 Claims, 7 Drawing Sheets

Figure 1:
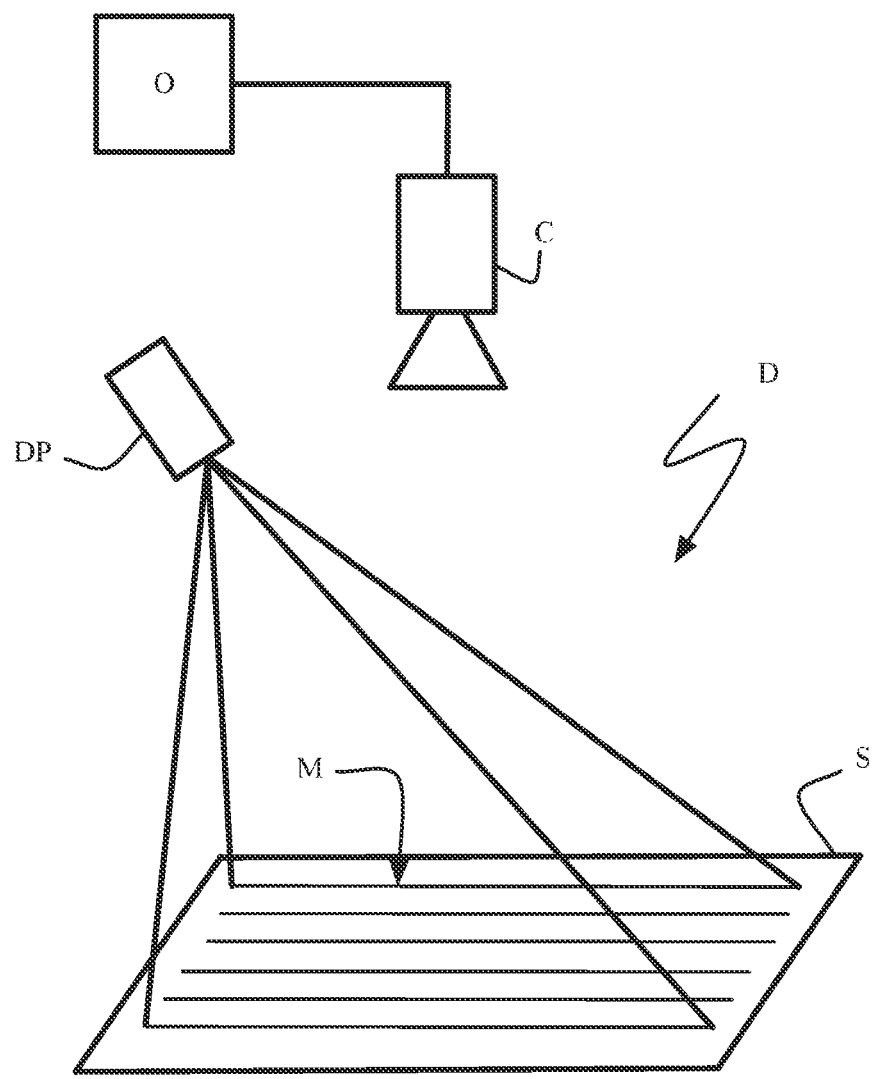

(51) Int. Cl.
*G06T 3/00* (2006.01)
*G06T 15/10* (2011.01)

(56) References Cited

OTHER PUBLICATIONS

Desbrun, M., et al.: "Intrinisic Parametrizations of Surface Meshes," 2002.*

Blair and Kudrolli, "Geometry of Crumpled Paper", Physical Review Letters Apr. 29, 2005.*
The PCT Search Report and Written Opinion for corresponding aplpication No. PCT/EP2010/066190, dated Jun. 5, 2012.
Tan, C.L., et al.: "Restoring Warped Document Images through 3D Shape Modeling," Feb. 2006.

* cited by examiner

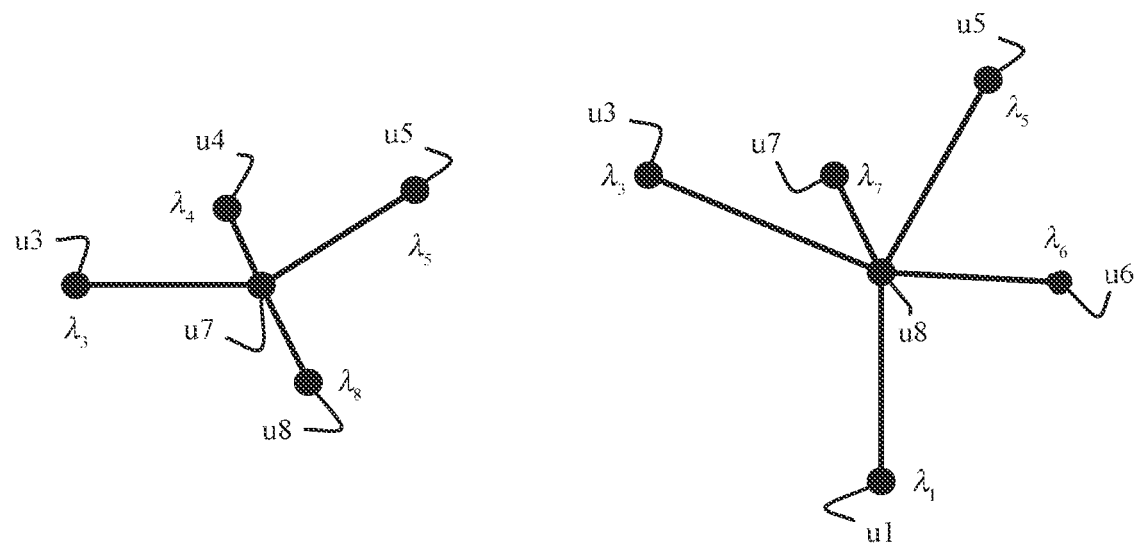
Fig. 9
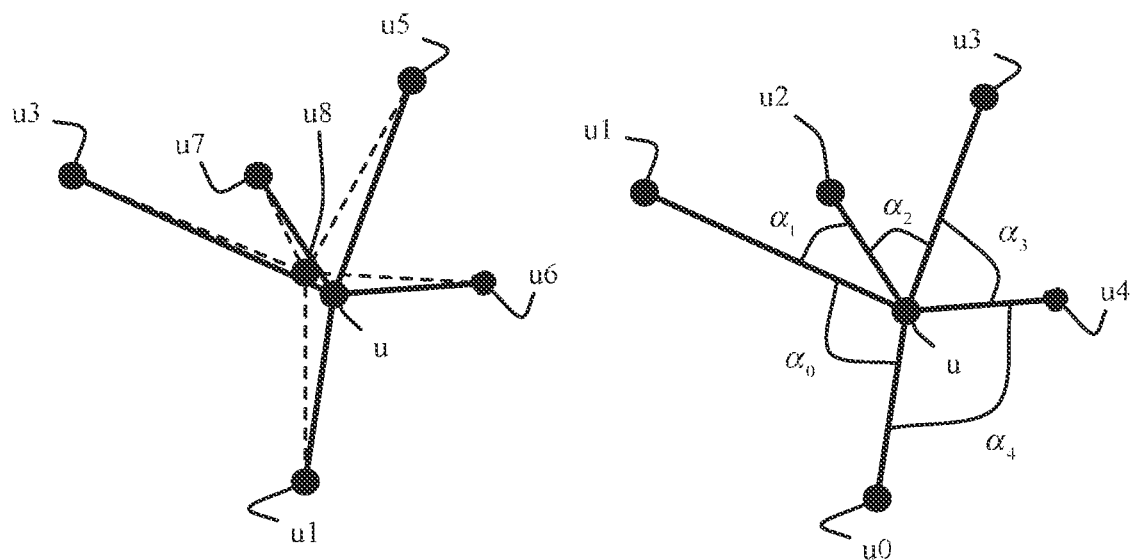
Fig. 10
Fig. 11

METHOD AND DEVICE FOR OBTAINING AN IMAGE OF A CRUMPLED DOCUMENT FROM AN IMAGE OF SAID DOCUMENT WHEN SAME IS CRUMPLED

This application is a U.S. National-Stage entry under 35 U.S.C. 371 based on International Application No. PCT/EP2010/066190, filed Oct. 26, 2010, which was published under PCT Article 21(2) and which claims priority to French application Ser. No. 09/57674, filed Oct. 30, 2009, the entirety of which in incorporated by reference.

The present invention concerns a method and device for obtaining an image of a smoothed-out document from an image of this document when it is crumpled.

The present invention can be implemented in any application that requires a comparison of information carried by a document with a digital model of this information defined by considering that the document is perfectly flat.

For example, the present invention can be associated with an automatic lottery ticket (document) validation device. This is because, in this type of application, the ticket comprises a grid, some boxes of which have been ticked by a player. The ticket is then placed on a support of the validation device, this device then takes an image of the ticket and compares the information carried by this image with a digital model of the winning grid.

When the document is crumpled, it is therefore necessary to smooth it out manually (unfold it) so that it is as flat as possible on the support, in order to avoid any distortion of the image acquired by the device that might falsify the result of the comparison between the ticket and the winning digital grid.

In this type of device, even if the ticket is not crumpled, the image acquired is however generally distorted because of the relative position of the support on which the document is placed and the camera used for acquiring the image of this document.

Methods are known for obtaining an image of a smoothed-out document from an image of this document when it is crumpled. The principle of these methods consists of projecting a target (markers) onto the document, deriving a three-dimensional geometric model from the surface of the crumpled document by extracting these markers on the acquired image and calculating, among other things, the distance between each marker of the acquired image and the camera then calibrated from this target, and applying three-dimensional homographs, either local or global, in order to obtain the image of the smoothed-out document from this three-dimensional geometric model of the surface of the crumpled document.

In these approaches, the three-dimensional geometric model is defined from one or two planes. In the case of one plane, the global homograph is then effected, while in the case of two planes two local homographs are effected according to each of the two planes.

Concerning the obtaining of a three-dimensional geometric model of the surface of the crumpled document from an acquired image, several approaches are conventionally used.

One of them consists of projecting onto a plane the markers extracted from the image at a given angle and triangulating the points of the three-dimensional geometric model thus obtained. The surface of the crumpled document is then modelled by a set of three-dimensional triangles connecting these points.

Another approach consists of defining the markers of the target by straight-line segments, projecting the straight-line segments of the target extracted from the image onto a plane at a predetermined angle, measuring the "real" projection angle and deforming the projection of the straight-line segments so that they are projected onto the plane at this measured angle.

Another approach consists of using a set of calibrated cameras. This approach is similar to the approach by projection of markers except for the detail that the projector is seen as an upside-down camera. Instead of a point of the image being acquired by the sensor, it is projected.

The current methods for obtaining an image of a smoothed-out document from an image of this document when it is crumpled are generic methods that are expensive in terms of computing time and obtain only images that have distortions at the crumpled parts of the document and significant aberrations at the edges thereof.

The inventor observed that, when a document has high spatial frequencies, that is to say the information carried by this document follows a geometric structure that is known a priori, these methods could be optimised to remedy the above drawbacks.

To this end, the present invention concerns a method for obtaining an image of a smoothed-out document from an image of this document when it is crumpled, the method comprising a step of determining a three-dimensional geometric model of the surface of the crumpled document by triangulation of three-dimensional points defined from a target extracted from an image of this document when it is crumpled. The method is characterised in that it comprises a step of determining a projection of the three-dimensional geometric model onto a plane, referred to as the acquisition plane, by error minimisation of this projection under constraint of preservation of geometric characteristics defined in the vicinity of the three-dimensional points, and in that it comprises a step of superimposing textures associated with the three-dimensional geometric model on the projection of this model thus determined.

The use of such a determination of a projection of the three-dimensional geometric model onto an acquisition plane, in this case the plane of the support on which the crumpled document is placed, reduces the time taken for calculating the image of the smoothed-out document and obtains an image that no longer has any distortions at the crumpled parts of the document or aberrations on the edges of this image.

According to other aspects, the present invention concerns a device that uses this method as well as targets that make it possible to improve the quality of the image resulting from the method and/or reduce the cost of computing this image.

Figure 2:
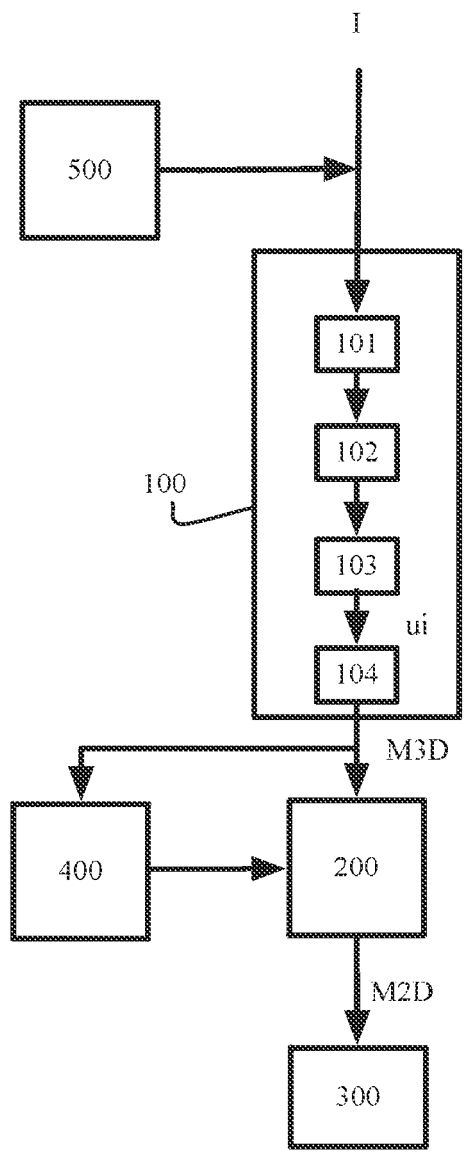
Figure 3:
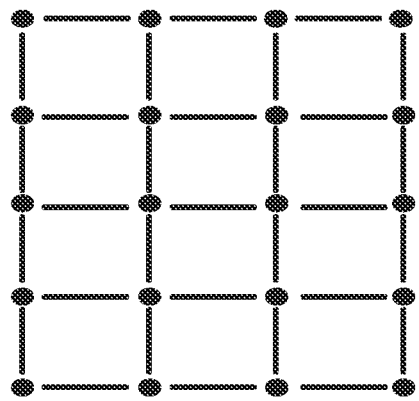
Figure 4:
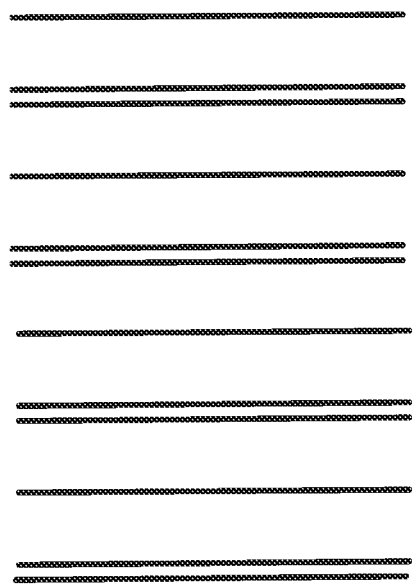
Figure 5:
Figure 6:
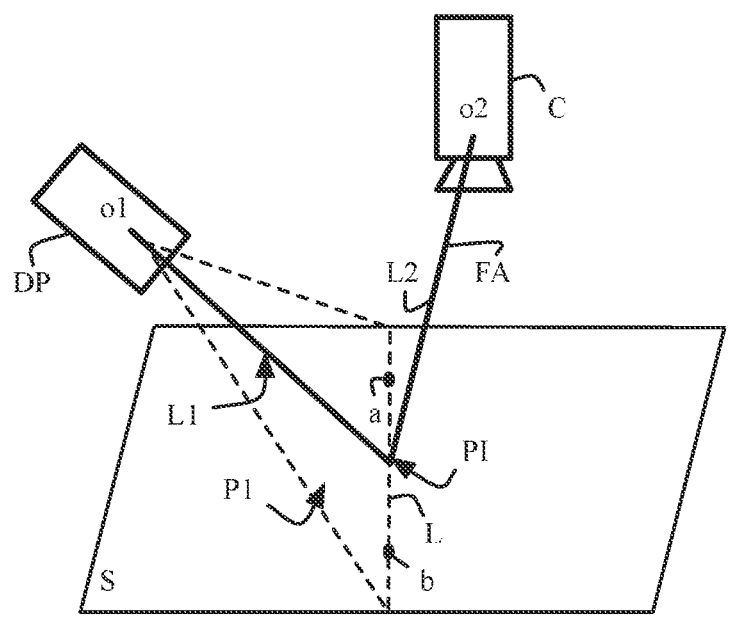
Figure 7:
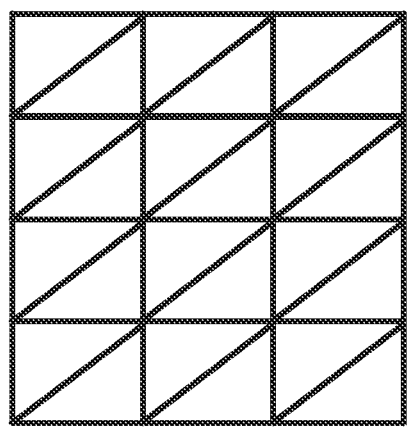
Figure 8:
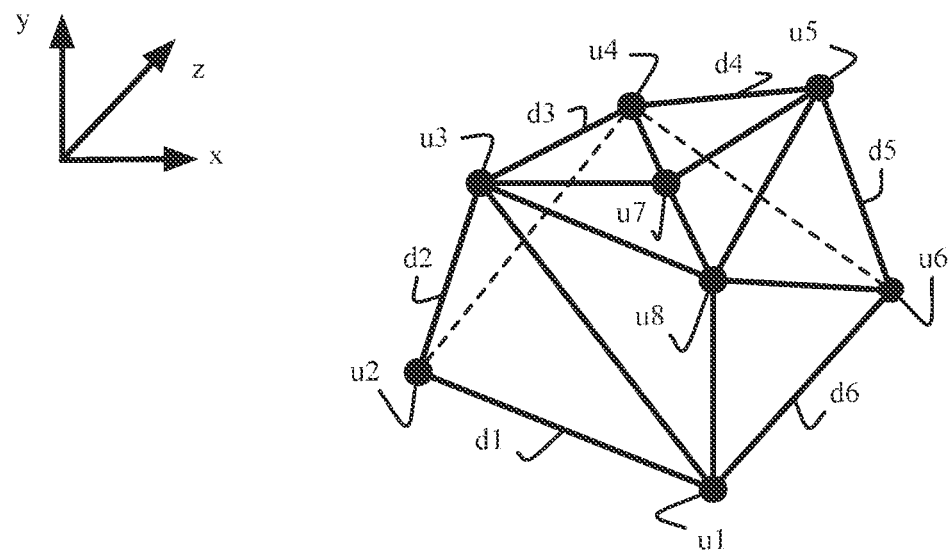
Figure 8:
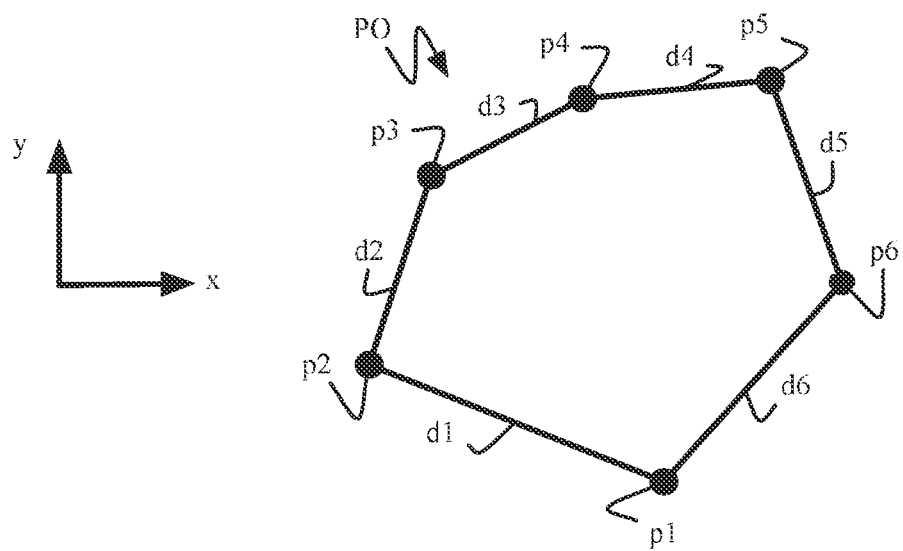
Figure 12:
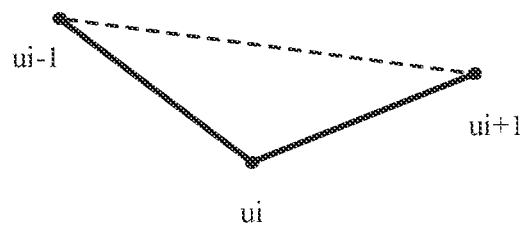
Figure 12:
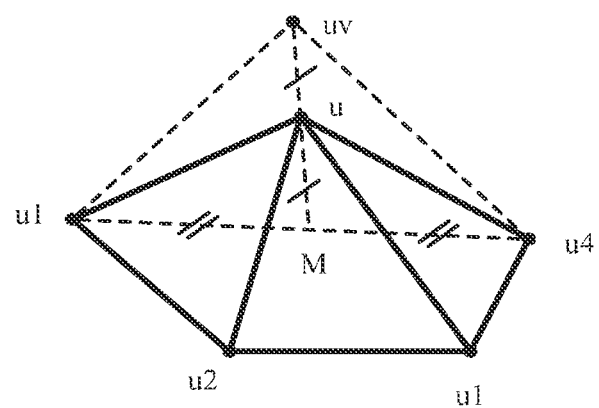

The features of the invention mentioned above, as well as others, will emerge more clearly from a reading of the following description of an example embodiment, the said description being given in relation to the accompanying drawings, among which:

FIG. 1 shows a device for obtaining an image of a smoothed-out document from an image of this document when it is crumpled, FIG. 2 shows a diagram of the steps of the method for obtaining an image of a smoothed-out document from an image of this document when it is crumpled, FIG. 3 shows an example of the target pattern, FIG. 4 shows another example of the target pattern, FIG. 5 shows an illustration of the indexing of the straight-line segments extracted according to one embodiment, FIG. 6 shows an illustration of the definition of the three-dimensional points of the geometric model of the surface of the document, FIG. 7 shows an example of triangular meshing for a given pattern, FIG. 8 shows an example of a polygon that delimits the projected surface of the smoothed-out document, FIG. 9 shows an example of vicinity of a three-dimensional point, FIG. 10 shows an example of replacement of a point by its barycentre, FIG. 11 shows an illustration of the calculation of the weighting coefficients associated with the three-dimensional points, and FIG. 12 shows an example of replacement of points of the polygon that delimit the contour of the projected surface of the crumpled document by another point.

The device D comprises an acquisition support S, one of the surfaces of which, referred to as the acquisition plane, is designed so that a crumpled document DO is placed thereupon.

The device also comprises a digital camera C and a device DP for projecting a target M. This target M comprises a structured pattern. This target M is used, prior to the implementation of the present invention, to calibrate the camera C.

The crumpled document DO is placed on the acquisition support S. The device DP then projects the target M and the camera C takes an image I of the document DO on which a superimposition of the pattern of the target M appears.

The camera C and the acquisition support S are positioned with respect to each other so that the projection of the target M is done along an axis different from that of the camera.

According to one embodiment, the device DP is positioned so that the target M is directly projected onto the document DO when the latter is placed on the acquisition surface S.

According to another embodiment, the device DP is positioned so that the target M is projected through the document DO. For this purpose, for example, the device DP projects the target M onto the surface opposite to the surface of the acquisition support S on which the document DO is placed. This embodiment can be used when the document DO and the support S have a sufficiently low opacity for the target to be visible on the image I.

The projection of the target M is effected by a light that belongs to a part of the light spectrum that may be either a visible part of the spectrum or the infrared part. Whatever the case, the part of the light spectrum used for projecting the target M is chosen so that the pattern of this target is visible by superimposition of the image I acquired from the document DO.

The device D also comprises means O, such as a computer, for implementing a method for obtaining an image F of the smoothed-out document DO from the image I. According to the example of FIG. 1, the means O are directly connected to the camera C. However, the present invention is not limited to the means O being directly connected to the camera C but can also obtain the image I from the camera C by other means such as radio-frequency means or from a memory.

In general terms, the method according to the invention comprises a step 100 of determining a three-dimensional geometric model M3D of the surface of the crumpled document DO by triangulation of the 3-dimensional points $u_i$ defined from the pattern of a target M extracted from the acquired image I, a step 200 of determining a projection M2D of the 3-dimensional geometric model M3D on an acquisition plane by error minimisation ERR of this projection under constraint of preserving defined geometric characteristics in the vicinity of three-dimensional points and a step 300 of superimposing the textures associated with the three-dimensional geometric model M3D on the projection M2D thus determined.

FIG. 2 shows a diagram of the steps of the method.

During step 100, the pattern of the target M that appears superimposed on the image I is first of all extracted from this image.

In general terms, the pattern of the target M is formed by points and/or at least one set of straight-line segments parallel to one another.

This means that the pattern may be formed by only one set of straight-line segments or several sets. For example, the pattern may be formed by two perpendicular sets so as to form a grid. However, the pattern may also be formed by points and at least one set of straight-line segments that define the vicinity relationships between these points, as illustrated in FIG. 3. Thus, the definition of the vicinity of the points of the image I, which will be used subsequently, is facilitated by the fact that the straight-line segments are also extracted from the image I and then directly designate the vicinity of each point extracted.

The choice of the method for extracting the pattern of the target from the image I (substep 101) depends on the choice of the pattern of the target M.

When the pattern comprises one (at least one) set of straight-line segments parallel to one another as shown in FIG. 1, the extraction of the straight-line segments of the image I consists of frequentially filtering the image I and then seeking local maxima of this filtered image I. This filtering is preferably carried out by using either a sinusoidal filter or a projection in Fourrier space.

When the pattern comprises points and at least one set of straight-line segments that define the vicinity relationships between these points, the extraction of the pattern is based on a search for sphericity in the image I for extracting the points and a calculation of energy in a colour plane of the image for extracting the straight-line segments. The sphericity may be defined by the Hough transform and the straight-line segments are then extracted according to a calculation of energy along the straight lines passing through the centre of the circles resulting from this transform.

For example, if the pattern is projected by a light with a strong red component, the search for sphericity of the points and the energy calculation will be limited to the red plane of the image I.

For the purpose of increasing the robustness of the indexing of the straight-line segments of the pattern, that is to say the probability that the extracted elements do indeed form part of the pattern of the target M, the pattern is, according to one embodiment, an alternation of single and double straight-line segments as illustrated in FIG. 4.

In a variant, the thicknesses of these straight-line segments are different and/or the distances that separate them are variable.

For example, the pattern may represent a barcode that enables each straight-line segment extracted from the pattern to be identified by its thickness and its distance from the adjoining straight line segments. Thus, each straight-line segment cannot be confused with another one in this pattern.

Once the pattern is extracted from the image I, the straight-line segments extracted from the image I are indexed (substep 102) in order to be able to match them with those of a theoretical pattern. This theoretical pattern is the one obtained by projection of the target M onto the acquisition surface on which no document is positioned or on which a non-crumpled document not having any deformation is positioned. Projection of the target does not make it possible to identify particular information on the document but only makes it possible to model the document in three dimensions. This is one of the advantages of the method that makes it possible to smooth-out documents without any knowledge of their contents or the patterns that they might include.

Indexing of the straight-line segments extracted consists, according to one embodiment, of determining the movement of these straight-line segments with respect to so-called reference straight-line segments. The straight-line segments are then indexed according to the closest reference straight-line segment according to the position of the projector.

FIG. 5 shows an illustration of the indexing of straight-line segments extracted according to this embodiment. Each straight-line segment extracted is indexed according to a zone $Z_i$ (I=1 to 6 according to the example). The zones $Z_i$ are defined by the space between two reference straight-line segments i−1 and i.

To increase the robustness of the indexing of these straight-line segments, the indexing is based on the spatial frequency of the pattern and, according to one embodiment, the indexing is based on a Fourrier approach. In the latter approach, the straight-line segments of the pattern are indexed by demodulation of the signal, that is to say the image I is projected into the frequential space in order to define zones $Z_i$, then these zones $Z_i$ undergo a reverse projection and are then indexed by a phase shift.

Once the extracted straight-line segments are indexed, the three-dimensional points $u_i$ are defined from the extracted pattern.

According to one embodiment, during the substep 103, the points $u_i$ are defined according to an approach illustrated in FIG. 6, which consists of determining these points $u_i$ by triangulation of points if the pattern is formed by points and by triangulation of straight-line segments if the pattern is formed by straight-line segments and by triangulation of the points and straight-line segments if the pattern is formed by points and straight-line segments.

In order to determine the points $u_i$ by triangulation of the straight-line segments indexed, the camera C is seen as a set of beams that are propagated on straight-line segments L2 that intersect the acquisition plane, in this case the plane of the support S on which the document DO is placed, at points of intersection PI. Moreover, the light projection of each straight-line segment of the pattern of the target on the acquisition plane forms a straight-line segment L that induces a light plane P1 that is defined by the optical centre o1 of the projection device DP, which is the point of origin of the emission of the projection light, and by two points a and b of the straight-line segment L. The equation of the plane P1 is a1*x+b1*y+c1*z+d1=0 in which the parameters (a1,b1,c1) are defined by the coordinates of the optical centre o1 and the coordinates of the points a and b.

The points $u_i$ of coordinates (x, y, z) are then obtained by solving the following system of equations:

$$\begin{cases} a1*x+b1*y+c1*z+d1=0 \\ a2*x+b2*y+c2*z+d2=0 \\ a3*x+b3*y+c3*z+d3=0 \end{cases}$$

in which a2*x+b2*y+c2*z+d2=0 and a3*x+b3*y+c3*z+d3=0 are the Cartesian equations of two planes that define the straight-line segment L2.

Likewise, the light projection of a point of the pattern of the target M onto the acquisition plane is a point of intersection PI (or a close point if there is no point of intersection) between the object to be modelled and the light beam. A straight-line segment L1 is thus defined by the optical centre o1 and the point p1 passing through the optical centre and the light beam.

Triangulating a point of the pattern of the target M then amounts to determining the point of intersection PI between the straight line L1 and the straight line L2, which is defined by the optical centre o2 of the camera and the point p2 passing through the optical centre o2 and the light beam.

The points $u_i$ of coordinates (x, y, z) are then determined in the following manner:

$u_i=(r1+r2)/2$ with $O=o1-o2$ $d2=p2-o2$ $d1=p1-o1$ $C=\{d2.y*d1.z-d2.z*d1.y, d2.z*d1.x-d2.x*d1.z, d2.x*d1.y-d2.y*d1.x\}$ $N=\|C\|^2$ $r2=o2+d2*DET(O,d1,C)/N$ $r1=o1+d1*DET(O,d2,C)/N$ in which DET is the function that calculates the determinant of a matrix 3*3.

Once the points $u_i$ have been defined, the three-dimensional model M3D is obtained by triangulation of these points so as to obtain a meshed representation of the surface of the document DO (substep 104).

According to one embodiment, this mesh is constructed from the structure of the pattern. By way of illustration, a triangular mesh for the pattern of FIG. 3 is shown in FIG. 7.

According to another embodiment, this mesh is constructed by a Delaunay triangulation.

During step 200, the points $u_i$ are projected onto the acquisition plane by minimisation of an error ERR defined from the points $u_i$ and from their projections $p_i$ onto the plane P under constraints of preservation of the geometric characteristics defined on a vicinity of the points $u_i$.

According to this embodiment, the error ERR is minimised under constraints of preservation of the distances between the points represented here by points at the top part of FIG. 8, and angles between the various edges, here represented by continuous and broken lines.

For this purpose, firstly, the projected surface of the model M3D is delimited by definition of a polygon PO that defines the contour of the projected surface of the smoothed-out document DO.

For this purpose, the points of the geometric model M3D are identified from all the three-dimensional points as being points of the polygon PO when these points define edges that belong to only one triangle of the geometric model M3D. The bottom part of FIG. 8 gives an example of a polygon formed from the points p1 to p6 issuing from the example of the model M3D in the top part of FIG. 8.

The distances between two consecutive points $u_i$ of the polygon PO, that is to say the length of the edges that separate them, and the angles between these edges, are then calculated. According to the example in FIG. 8, the distances $d_1$ to $d_6$ and the angles between these edges are calculated.

Secondly, the points $u_i$ of the model M3D, here the points $u_7$ and $u_8$, which do not belong to the edges, that is to say those that are inside, in a strict sense, the closed polygon PO, are considered to be internal points that are expressed mathematically by a weighted linear combination of their neighbours. More precisely, an internal point $u_i$ is expressed by $$u_i = \sum_{v=1}^{N_i} \lambda_v u_v \quad (1)$$

with $N_i$ an integer equal to the number of neighbours of the point $u_i$, $\lambda_v$ a weighting coefficient and $u_v$ one of the $N_i$ points adjacent to the point $u_i$.

FIG. 9 shows the points $u_7$ and $u_8$ as well as their adjacent points, in this case the points $u_3$, $u_4$, $u_5$ and $u_8$ for the point $u_7$ and the points $u_1$, $u_3$, $u_5$, $u_6$ and $u_7$ for the point $u_8$.

According to one embodiment, the weighting coefficients $\lambda_v$ relating to the $N_i$ points adjacent to a point $u_i$ are equal to $1/N_i$.

In order to keep the geometric constraints of the model M3D, according to one embodiment, the internal point $u_i$ of equation (1) is replaced by a three-dimensional point u defined as being the barycentre of the points $u_v$ adjacent to this internal point $u_i$ as illustrated in FIG. 10 in the case of the internal point $u_8$ and where the broken lines represent the model M3D with the replacement of the point $u_8$ by the barycentre u.

Each weighting coefficient $\lambda_v$ is then equal to $$\lambda_v = \frac{w_v}{\sum_{n=1}^{N_i} w_n} \text{ with } w_v = \frac{\tan(\alpha_{v-1}/2) + \tan(\alpha_v/2)}{\|u_v - u\|}$$

in which $\alpha_v$ is the angle formed by the two edges $a_v$ and $a_{v+1}$ that connect the barycentre u to two consecutive adjacent vertices $u_v$ and $u_{v+1}$ and $\alpha_{v-1}$ is the angle formed by the two edges $a_{v-1}$ and $a_v$ that connect the barycentre u to two consecutive adjacent vertices $u_{v-1}$ and $u_v$.

Thus, according to the example in FIG. 11, in which the vertices $u_1$, $u_3$, $u_5$, $u_6$ and $u_7$ have respectively been renumbered $u_0$, $u_1$, $u_2$, $u_3$ and $u_4$, the coefficient $w_0$, which is used for calculating the coefficient $\lambda_1$, is given by $$w_0 = \frac{\tan(\alpha_4/2) + \tan(\alpha_0/2)}{\|u_0 - u\|},$$

the coefficient $w_1$, which is used for calculating the coefficient $\lambda_3$, is given by $$w_1 = \frac{\tan(\alpha_0/2) + \tan(\alpha_1/2)}{\|u_1 - u\|},$$

the coefficient $w_2$, which is used for calculating the coefficient $\lambda_1$ is given by $$w_2 = \frac{\tan(\alpha_1/2) + \tan(\alpha_2/2)}{\|u_2 - u\|},$$

the coefficient $w_3$, which is used for calculating the coefficient $\lambda_5$, is given by $$w_3 = \frac{\tan(\alpha_2/2) + \tan(\alpha_3/2)}{\|u_3 - u\|},$$

and the coefficient $w_4$, which is used for calculating the coefficient $\lambda_6$, is given by $$w_4 = \frac{\tan(\alpha_3/2) + \tan(\alpha_4/2)}{\|u_4 - u\|}.$$

The inventor observed that the choice of the points of the model M3D for forming the polygon PO did not make it possible to obtain a polygon PO that faithfully reproduces the contour of the projected surface of the model M3D when this contour has concavities. To overcome this drawback, when a concavity is present at the point $u_i$ of the polygon PO, this point is considered to be an internal point that is then treated as explained above and a new edge is formed between the two points $u_{i-1}$, $u_{i+1}$ of the polygon PO, which are adjacent to this point as illustrated at the top part of FIG. 12, in which the new edge is shown in a broken line.

When a convexity is present at a point u of the polygon PO, a virtual point $u_{N+1}$ is added to the polygon PO and this point u is considered to be an internal point.

According to one embodiment, the virtual point $u_{N+1}$ is defined by the central symmetry point at this point u that is carried by a straight line connecting the point u to the middle of the edge that connects two points of the polygon $u_{i-1}$, $u_{i+1}$ adjacent to the point u, as illustrated at the bottom part of FIG. 12. In this example, let it be assumed that the points $u_1$ to $u_4$ and u are points of the polygon PO. A convexity at the point u is present. A virtual point virtual $u_{N+1}$ is then defined by the central symmetry point at u of the middle of the two points adjacent to u, in this case $u_1$ and $u_4$.

In mathematical terms, a virtual point $u_{N+1}$ is defined by:

$$u_{N+1} = 2*u - M \text{ and } M = (u_1 + u_N)/2$$

that is to say the following equation is satisfied:

$$u = \sum_{i=1}^{N+1} \lambda_i u_i$$

The weighting coefficients are then defined by:

$$\lambda_i = \frac{w_i}{\sum_{j=1}^{N+1} wj} \text{ with } w_i = \frac{\tan(\alpha_{i-1}/2) + \tan(\alpha_i/2)}{\|u_i - u\|}$$

Fourthly, the model M3D is projected onto the acquisition plane P while minimising the projection error ERR under constraints of preservation of geometric characteristics defined in the vicinity of the points $u_i$.

According to one embodiment, the error ERR is minimised iteratively so as to decrease the divergence between the linear combinations of equation (1), which represents the internal points of the model 3D and the linear combinations of the points of the projection M2D. An algorithm of the LSQR (Linear and Sparse least sQuaRes) is for example used for this purpose but any other system resolution method may suit.

Finally, the projected points pi, obtained at the end of the minimisation of the error ERR, are preferably triangulated according to Delaunay triangulation.

At the end of step 200, the projection M2D is a bidimensional geometric representation of the smoothed-out document DO. This representation contains a set of triangles, the vertices of which are either the projections $p_i$ of the point $u_i$, or the projections of the virtual points.

During step 300, the image F of the smoothed-out document is obtained by superimposing the texture of each triangle of the model M3D on the corresponding triangle of the representation M2D by plane homography, that is to say by applying a transformation to each of the points. The transformation is a matrix given by:

$$\begin{pmatrix} x1 & x2 & x3 \\ y1 & y2 & y3 \\ z1 & z2 & z3 \end{pmatrix}^{-1} * \begin{pmatrix} x4 & x5 & x6 \\ y4 & y5 & y6 \\ z4 & z5 & z6 \end{pmatrix}$$

in which X1 of coordinates (x1, y1, z1), X2 of coordinates (x2, y2, z2) and X3 of coordinates (x3, y3, z3) are three points that define the plane before transformation and X4 of coordinates (x4, y4, z4), X5 of coordinates (x5, y5, z5) and X6 of coordinates (x6, y6, z6) are three points that define the plane after transformation.

The image F is therefore a visual digital representation of the smoothed-out document DO.

According to one embodiment of the method, the step 200 of the method is preceded by a step 400 of reducing the complexity of the three-dimensional geometric model M3D, during which the geometric model M3D issuing from step 100, which, it will be recalled, is a three-dimensional representation of the surface of the crumpled document DO defined by a set of triangles, the vertices of which are the points $u_i$, is re-meshed in order to reduce the number of triangles and points of this model.

To this end, the topology of the model M3D is defined for each point $u_i$ by all the angles formed by the edges that connect this point $u_i$ and each of its neighbours. During step 400, if the topology around the point $u_i$ is not flat, that is to say the angles are too great, the topology of this point $u_i$ remains unchanged. In the contrary case, the point u; is omitted from the three-dimensional model M3D and the points adjacent to this point $u_i$ are then once again triangulated in order to re-form a mesh locally.

The three-dimensional model M3D obtained at the end of step 100 is a mono-resolution geometric representation of the surface of the crumpled document DO.

It is advantageous to obtain models M3D at different resolutions so that the minimisation of the error ERR achieved during step 200 for one of these models is applied to finer and finer resolutions according to constraints of calculation time or precision of the result obtained.

To this end, the method comprises a step 500 of approximating the surface of the crumpled document by a set of wavelets in space and, optionally, the low-intensity elements after definition of the various representations by these wavelets are eliminated in order to limit the complexity of the multi-resolution model M3D thus obtained.

The invention claimed is:

1. A method for obtaining an image of a smoothed-out document from an image of this document when it is crumpled, said method comprising:
    determining a three-dimensional geometric model of the surface of the crumpled document by triangulation of three-dimensional points defined from the pattern of a target extracted from the image of this document when it is crumpled,
    determining a projection of the three-dimensional geometric model on a so-called acquisition plane including:
        defining a polygon that defines the contour of the projected surface of smoothed-out document,
        identifying points of the three-dimensional geometric model among all the three-dimensional points as being points of the polygon when these points define edges that belong to only one triangle of the three-dimensional geometric model,
        defining for each point of the geometric model internal to the closed polygon a weighted linear combination of their neighbours, and
        minimizing of error of this projection under constraints of preservation of the distances between the three-dimensional points of the three-dimensional geometric model and preservation of the angles between the various edges that connect these three-dimensional points by decreasing the divergence between the weighted linear combination of the neighbours of said internal points of the three-dimensional geometric model and linear combinations of the points of the projection.

2. The method according to claim 1, in which the pattern comprising at least one set of straight-line segments parallel to one another, during the determining a three-dimensional geometric model of the surface of the crumpled document, the straight-line segments of the pattern are extracted from the image by frequential filtering of the acquired image and search for the local maxima of this filtered image, the straight-line segments extracted are then indexed with respect to reference straight-line segments, and the three-dimensional points are then determined by triangulation of the straight-line segments thus indexed.

3. The method according to claim 1, in which the pattern of the target comprising a set of points and straight-line segments that define the vicinity relationships between these points, the points are extracted from the image by a search for sphericity in the acquired image and the straight-line segments are extracted from the image by energy calculation in a colour plane of the image, the straight-line segments extracted are then indexed with respect to reference straight-line segments, and the three-dimensional points are then determined by triangulation of the points and straight-line segments thus extracted.

4. The method according to claim 1, in which, when a concavity is present at a point of the polygon, this point is considered to be an internal point and, when a convexity is present at a point of the polygon, a virtual point is added to the polygon and the point of the polygon is then considered to be an internal point.

5. The method according to claim 4, in which a virtual point is defined by the central symmetry point at the point of the polygon that is carried by a straight line connecting the point of the polygon to the middle of the edge that connects two adjacent points of the point of the polygon.

6. The method according to claim 4, in which each three-dimensional point that is considered to be an internal point is replaced by the barycentre of its adjacent points.

7. The method according to claim 1, in which the step (200) of determining a projection of the three-dimensional geometric model is preceded by reducing the complexity of the three-dimensional geometric model, during which, if the topology around a three-dimensional point of the geometric model is not flat, the topology of this point remains unchanged and, in the contrary case, the point is omitted from the three-dimensional model and the points adjacent to this point are then once again triangulated.

8. The method according to claim 1, further comprising a approximating the surface of the crumpled document by a set of wavelets in space, a multi-resolution three-dimensional geometric model is then obtained and the steps of the method according to claim 1 are then executed in order to determine a three-dimensional geometric model at at least one of the resolutions defined by this set of wavelets.

9. An apparatus configured to output a pattern, the apparatus comprises:
- a computer processor;
- a module operable on the computer processor for projecting the pattern of a target intended onto a crumpled document, an image of the pattern is acquired by a camera, and formed by at least one set of straight-line segments parallel to one another, wherein the pattern is also formed by points, said straight-line segments then defining the vicinity relationships between these points,
- wherein the pattern is formed by an alternation of single and double straight-line segments and/or the thickness of these straight-line segments are different and/or the distances that separate the straight-line segments are variable.

10. A device for obtaining an image of a smoothed-out document from an image of this document when it is crumpled, said device comprising an acquisition support, one of the surfaces of which, referred to as the acquisition plane, is designed so that a crumpled document is placed thereupon, a calibrated digital camera intended for acquiring the image of the document when it is crumpled, and a device for projecting a target that comprises a structured pattern formed by at least one set of straight-line segments, the camera and the acquisition support being positioned with respect to each other so that the target is projected along an axis different from that of the camera, characterised in that it comprises means for implementing a method according to claim 1.

* * * * *